Figure 1:
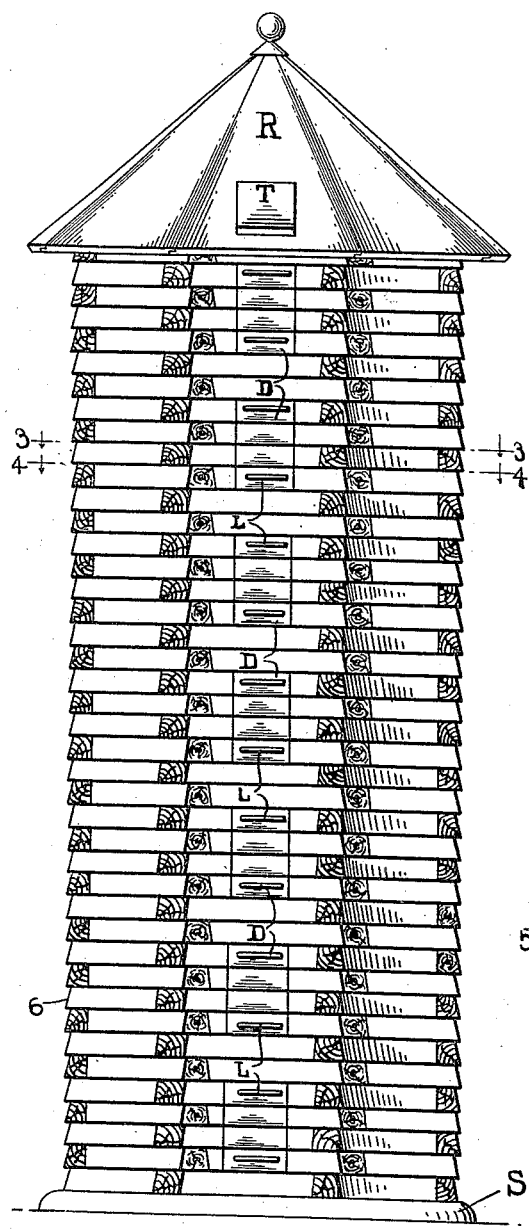

C. E. WEBSTER.
SILO.
APPLICATION FILED JUNE 24, 1912.

1,059,794.

Patented Apr. 22, 1913.
3 SHEETS—SHEET 1.

Witnesses
L. B. James
N. L. Collamer

Inventor
Charles E. Webster
By H. B. Willson & Co.
Attorneys

C. E. WEBSTER.
SILO.
APPLICATION FILED JUNE 24, 1912.

1,059,794.

Patented Apr. 22, 1913.

3 SHEETS—SHEET 2.

Witnesses
L. B. James
N. L. Collamer

Inventor
Charles E. Webster

By H. B. Willson & Co
Attorneys

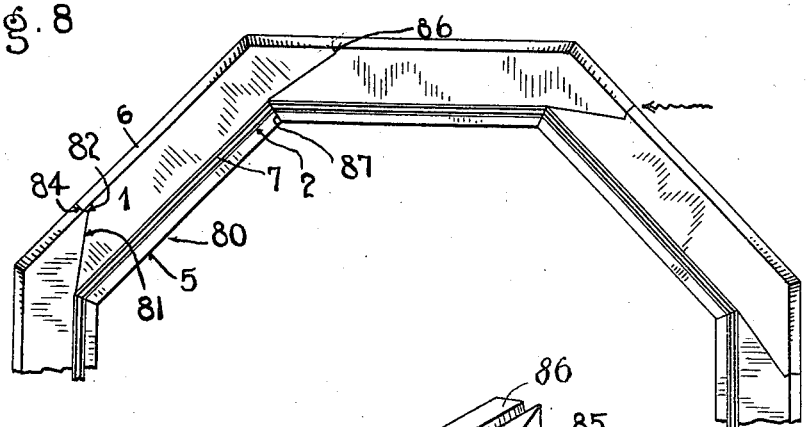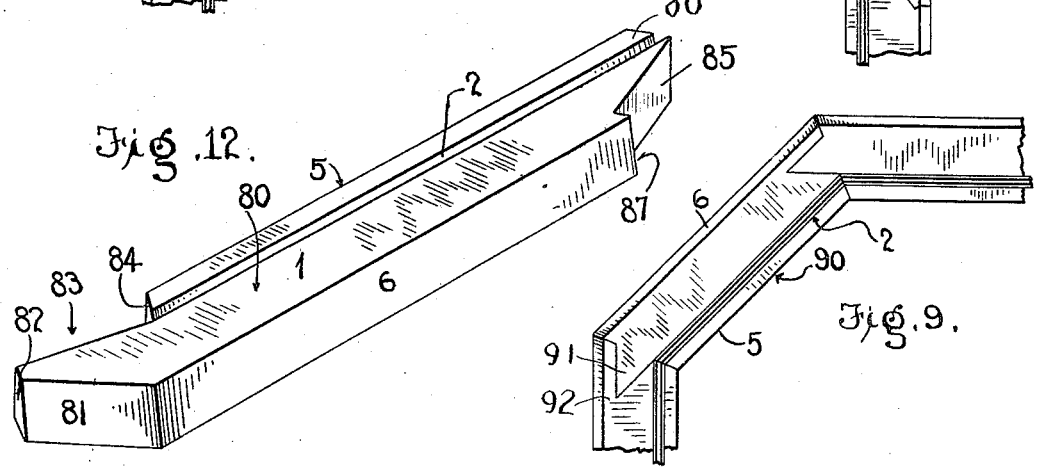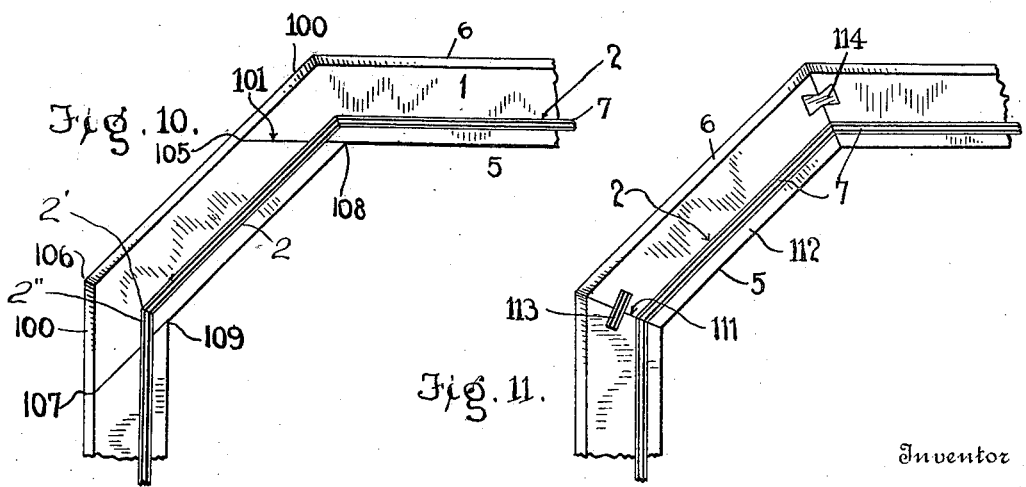

UNITED STATES PATENT OFFICE.

CHARLES E. WEBSTER, OF WINTHROP, MINNESOTA.

SILO.

1,059,794. Specification of Letters Patent. Patented Apr. 22, 1913.

Application filed June 24, 1912. Serial No. 705,575.

*To all whom it may concern:*

Be it known that I, CHARLES E. WEBSTER, a citizen of the United States, residing at Winthrop, in the county of Sibley and State of Minnesota, have invented certain new and useful Improvements in Silos; and I do declare the following to be a full, clear, and exact description of the invention, such as will enable others skilled in the art to which it appertains to make and use the same.

This invention relates to wooden buildings, and more especially to silos; and one object of the same is to erect a structure of this character and for this purpose which shall be polygonal in cross section, whether octagonal, hexagonal or the like, as high and as large as may be desired, and whose wall shall be made up of like units preferably of wood and formed of uniform size and shape throughout excepting that by preference I make them in "rights" and "lefts" and lay them oppositely in alternate rows or tiers around the building as it is erected.

Another object is to provide a series of "filler" members made up of like units preferably also of wood and preferably formed of the same cross section but mitered at their ends, so that a row of fillers may be quickly laid between each two rows of the members above referred to.

Still another object of the invention is to provide a simple form of tongue-and-groove connection between the members of all types in contiguous rows, so arranged that neither end of the grooves nor of the tongues will be exposed to the weather on the exterior of the silo or to the ensilage on the interior thereof.

Still another object of the invention is to simplify the construction of the units composing this building so that they may be cheaply made in great quantities, easily stored and transported, put together in the erection of the silo by a person not necessarily a skilled mechanic or having a variety of tools, and producing a building which shall be water-proof, and proof so far as possible against the deleterious effects of the acid and dampness in the ensilage.

With these and other objects in view the invention consists in the construction hereinafter more fully described and claimed, and as shown in the drawings wherein—

Figure 3:
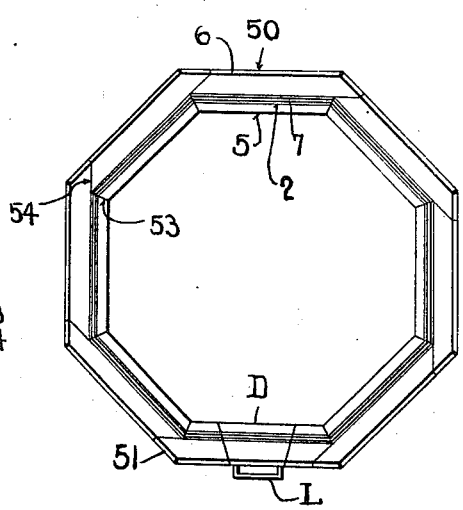
Figure 4:
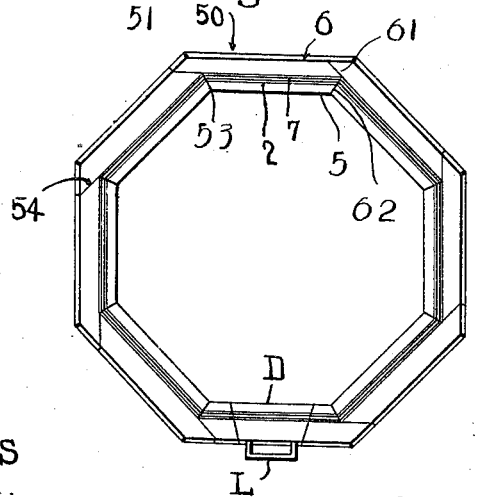
Figure 2:
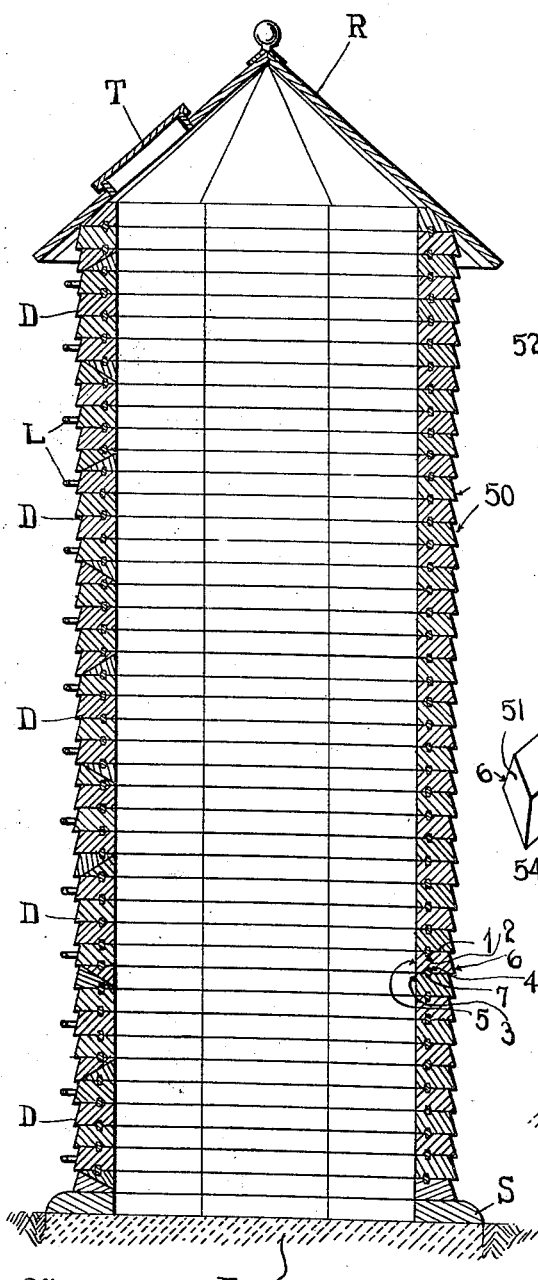
Figure 5:
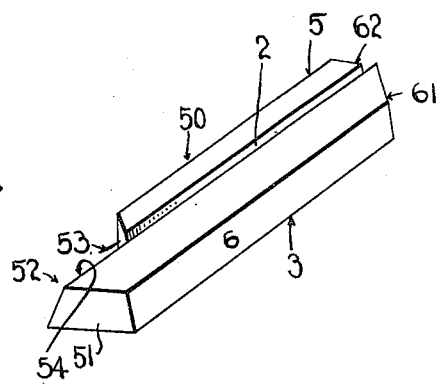
Figure 6:
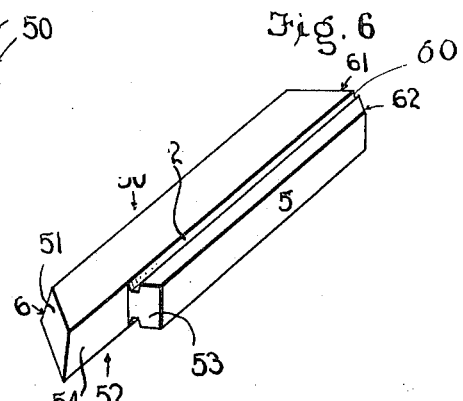
Figure 7:
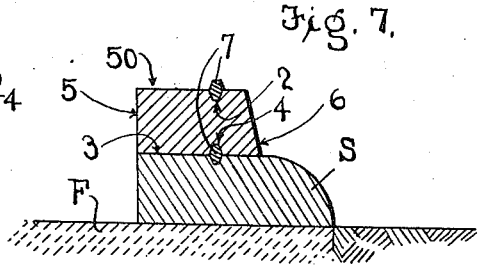

Figure 1 is a front elevation of a silo erected according to my invention, and Fig. 2 is a central vertical longitudinal sectional view thereof; Figs. 3 and 4 are cross sections on the lines 3—3 and 4—4 of Fig. 1; Figs. 5 and 6 are perspective details of one form of units which may be employed in erecting this building; Fig. 7 is a cross sectional view through one of these units located upon the sill, and the latter mounted upon a base or foundation below the ground level; Figs. 8, 9, 10 and 11 are plan views of slightly different forms of units which may be employed; and Fig. 12 is a slightly enlarged perspective detail of what might be called the preferred form of unit, being that shown in plan view in Fig. 8.

It will not be necessary in this specification to go into a detailed description of the construction of the roof R with its trap door T if one be employed; the doors D may well be formed by sawing through the wall of the silo on lines which converge outwardly as indicated in Figs. 2 and 3 so as to produce door-openings at proper points, and the doors themselves will be made up of the connected units thus sawed out of the wall of the building; the silo will by preference be provided with an exterior ladder roughly indicated by the letter L; and the sill S will be or may be mounted on a suitable foundation F and will by preference project slightly beyond the lowermost row of units as indicated in Fig. 7. Aside from these details the body of the silo will be polygonal in cross section, and in the drawings I have shown it as octagonal although of course it could have more or less faces than eight, as for instance six or twelve. I prefer eight, however, because the extremities of the units at the edges of each wall or faces of the silo will then abut on angles which are commonly found in miter-boxes and the material from which the units are formed can then be cut easily and without the necessity for special bevels or tools. The length of each unit which will be the width of each wall and which will therefore control the aggregate size of the silo, may be such as desired, but by preference I would have the walls rather narrow so that no interior or exterior beams would be required to brace them.

As above intimated this improved silo is built up of units, each of which is sawed from a strip or length of lumber with the proper cross section, and by preference the section is such as to produce weather boarding on the exterior of the building as will be described, so that the silo will not leak even though the units lie one upon the other without the interposition of cement or other plastering. The vertical and lateral dimensions of each unit and its length, are matters of no moment; the shape of the cuts at both ends of each unit is susceptible of wide modification without departing from the spirit of the invention, and several of them are explained below and illustrated in the drawings herewith; and I do not wish to be limited with respect to the kind of wood that is employed, nor its treatment to render it water-proof and weather-proof and to cause it to resist the action of the acids in the ensilage, although it might be well to suggest that I prefer to dip the lengths of lumber before the units are cut or the units themselves after they are cut into a composition composed of graphite and asphalt in the proper proportions, and it may be well to secure the unit or the rows of units one upon the other by means of twenty-penny nails which also have been dipped in the same or substantially the same composition to render them rust-proof. It will be observed from what follows that the rows of units are connected with each other by means of tongue-and-groove joints, and I may here say that I prefer to form the length of lumber with grooves in both sides rather than with a groove in one side and a tongue on the other, and cut the tongues separately and mount them separately in the groove along one face of the length, holding them in place either by the wedging shape of the grooves and tongues or by means of cement or otherwise. The obvious purpose of this course is to save lumber, as there is less waste in cutting a length which is flat on both faces excepting for the grooves, than if it were cut so as to have an integral rib or tongue projecting from one face—especially where one edge of the length is to be cut away so as to produce the weather boarding effect and in this "waste" or cut-away portion is sufficient lumber to produce the tongue.

Coming now more particularly to the present invention, the material from which the units are made is cut first in lengths of probably sixteen feet and approximately trapezoidal in cross section as best seen in Fig. 7; that is to say, the upper face 1 is flat except for a groove 2 which is preferably tapered downward slightly as shown in Fig. 6, the lower face 3 is also flat and parallel with the upper face and provided with a similar but reversed groove 4 directly beneath the upper groove 2, the inner face 5 is by preference flat and at strict right angles to the upper and lower faces as shown, and the outer face 6 is formed to imitate weather-boarding as by being inclined outward and downward slightly as seen in Fig. 7, although the specific formation of the imitation weather-boarding is not essential. I would prefer that the lower face 3 be wider than the upper face so that, when the units are laid one upon the other as seen in Fig. 2, with their inner faces 5 flush to form the inner face of the side wall, each juncture between the upper face of one unit and the lower face of the unit above will be protected by the overhanging lower edge of the outer face or weather-boarding 6, whatever the specific formation of the latter. Moreover, I would prefer that the grooves 2 and 4 in the opposite faces be superimposed or in line with each other, so that when the tongues 7 are inserted therein all the inner faces 5 will stand in one plane as well seen in Fig. 2. These tongues will, of course, be strips or keys sawed to fit the shape of the grooves 2 and 4, and if the latter flare outward from the center of each strip the tongues will have a corresponding taper upward and downward from their vertical centers as will be understood. As above suggested, the manner of securing these tongues in the grooves is not essential to the present invention, and in fact they might simply be laid in or driven into the grooves although I would preferably insert them into such grooves in the lengths of the lumber before the latter is sawed up into units. Such lengths may be said to be trapezoidal in cross section (disregarding the tongues and grooves) with the bases of the trapezoid horizontal and forming the upper and lower faces 1 and 3, one side strictly vertical and forming the inner face 5, and the other side oblique or beveled downwardly and outwardly and forming the outer face or weather-boarding 6; and it is my preference to cut the units into lengths greater than any other dimension, as the lengths may be measured in feet while the transverse dimensions might be measured in inches.

In Fig. 11 is shown an extremely simple manner in which the extremities of each unit may be cut, so as to prevent either end of the grooves or the tongues from becoming exposed for the admission of moisture. Here the ends 111 are simply mitered on lines oblique to the longitudinal axis of the unit 112, and these lines diverge from each other radially outward from the center of the octagonal or hexagonal figure constituting the silo or other building being erected. This divergence necessitates the use of fastening means of which two forms are shown at 113 and 114, uniting the meeting ends of contiguous units in the same row, but said fastening means or devices may be omitted where the tongue-and-groove connection between this row of units and those above and below it is employed, although I have illustrated the fastening means as typical of any that may be used if preferred.

The outer face 6 of the unit in this figure is beveled as above described, so that the cross section of the unit will be trapezoidal, and the tongue and groove arrangement is the same as set forth; but otherwise it is a form of unit which I would probably use only as a "filler" between other rows of units having butt and lap joints between their meeting ends as yet to be described.

In Fig. 9 I show another form of "filler" unit 90 also trapezoidal in cross section and having the tongue-and-groove connection above described, its outer face 6 being beveled and longer than its inner upright face 5; but the fastening devices just mentioned in the paragraph above are replaced in this instance by a tenon 91 projecting from one end of the unit 90 and entering a socket 92 in the contiguous end of the next unit in this row. This illustration is typical of any form of fastening which may be employed between the meeting ends of units in the same row; but attention is again directed to the fact that none of the tenons or sockets nor the tongues or grooves are exposed for the admission of moisture from either the exterior or the interior of the silo. I might further say that in both forms of filler unit the end grain of the wood is also not exposed to moisture at any point.

In Fig. 10 is shown what might be called the simplest form of my improved unit having a butt and lap joint. This is produced by cutting off the strip or length of lumber on lines 100 and 101 which converge toward the outer face of the unit, the cut 101 being strictly upright, whereas the cut 100 is beveled to correspond with the bevel of the outer face of the trapezoid-shaped body. It follows that the exposed beveled face extends from the point 105, throughout the length of the outer face 6, around the angle 106, and across the end 100 to the next point 107; and the inner face of any unit is exposed only between the points 108 and 109. No end grain whatever is exposed to the deleterious effect of acids in the ensilage, and only a short stretch of end grain (from 106 to 107) is exposed to the weather, while even this stretch is beveled so as to shed off the rain. The extremity 101 might be called the "butt" end and its grain is protected by the inner face 5 of the next unit to the right in Fig. 10, and the other end, bounded by the triangle 106, 107, 109, might be called the "lap" end which comes in contact with the butt end of the unit next to the left in this view. In order that the grooves 2 in any one unit may not run out and be exposed, I extend them in this form from the butt end 101 to a point 2' on a line between 106 and 109 where the lap end 100 joins the body, and there give them an angle as shown and continue them as at 2" out the inner side edge between the points 107 and 109 so that they will aline with the grooves in the next adjacent units, and the tongues 7 may be successfully applied. When a silo is constructed of units of this character, whereof those in one row are laid lapping to the left and those in the next adjacent row lapping to the right, it will be clear that the joints overlap each other or "break joint" with each other and that the tongue-and-groove connection between the different rows will hold the parts together. To an extent this is the same result as would follow if the construction shown in Fig. 9 were employed with the tenons 91 thereof in one row projecting to the left and in the next row to the right, whereas the construction illustrated in Fig. 11 would never break joint and I would therefore prefer to use it as a filler between rows of other construction.

In Figs. 5, 6, 7, and also in Figs. 3 and 4 I have shown another form of unit 50 (a "right" being shown in Fig. 5 and a "left" in Fig. 6) whereof the butt end is cut off strictly upright as before, but on a line 62 which is approximately radial to the silo and extends out to a point 60 which is intersected by the grooves 2, and then on a second line 61 extending from that point to the outer face of the unit and converging toward the other end thereof. The lap end is also cut off on a broken line, beginning with that portion 53 which is approximately radial to the silo and extends outward to the grooves 2, continuing thence longitudinally of the unit as at 54 so as to form a recess 52, and concluding with an oblique cut 51 converging toward the cut 61, extending to the outer face 6 of the unit, and like it formed in imitation of weather-boarding. When units of this kind are laid end to end, as shown in Figs. 3 and 4, the cut-off portion or shoulder 62 of one unit rests against the shoulder 53 of the adjacent unit, and the flat inner wall 54 of the lap end rests against the flat cut 61 of the butt end of the next adjacent member. Attention is directed to the fact that here again both grooves and tongues are protected from moisture either inside or outside of the silo, and only one extremity of the lap end of each unit is exposed to the weather and that end is beveled in imitation of weather-boarding.

In Figs. 8 and 12 is shown what might be called my preferred form. Here the unit 80 has its outer face 6 beveled, and the lap end 81 is also formed with the bevel so as to shed water, while the inner face is yet upright at 5 on the inside of the building. The extremity of the beveled end 81 is cut off as as 82, and the inner portion of the body is recessed as at 83, the inner extremity of the recess being connected by a shoulder 84 with said face 5—much the same as the recess 52 and shoulder 53 of Fig. 6 excepting that the length of the upright wall of the recess 83 at 82, and the inner portion of the body is unit as will be seen from a close inspection of Fig. 8. This requires that the butt opposite end be cut off oblique as at 85 on a proper angle to fit the face of the recess 83, but makes it impossible for weather to beat into the building in the direction of the arrow shown in Fig. 8. This end 85 of the unit is cut off as at 86 so as to fit against the shoulder 84, and shouldered as at 87 to receive the cut-off extremity 82 of the lap end of the contiguous unit. These units, like all others described, are laid in rows, first a series of rights being laid around the building in one direction, and then a series of lefts in the opposite direction, with or without the interposition of a row of "fillers" as shown in Figs. 9 or 11, and the units in one row nailed or otherwise secured upon the units in the row beneath if desired, or permitted to become attached thereto by driving them down so that the wedge-shaped tongues will fit into the wedge-shaped grooves. With my preferred form of units the grooves 2 extend straight from the butt end to the shoulders 84 on the lap end, and therefore the angles 2' of the form shown in Fig. 10 are not necessary. But whatever the form of butt and lap joint units, I would dispose their grooves the same distance from their inner faces as are the grooves in the mitered units above described.

Broadly speaking, the more numerous and complicated the angles given to each end of each unit, the more intimate their fit to each other, the less likely they will be to become disengaged, and the greater obstruction they offer to the beating in of rain. To these ends it might be said that the unit with the greater number of angles is preferred. On the other hand, it is more expensive to cut units of this kind, and from the standpoint of economy it might be said that the simpler unit is preferred. However, I have found that the unit best seen in Fig. 12 presents no or very few sharp corners to become split or broken or jammed in transportation or storage, and the result is that by the time it reaches the consumer or user and is by him built into place it is in better condition than most of the others illustrated. For this reason additional to those mentioned above it might, therefore, be said to be my preferred form. As hereinbefore suggested, I do not wish to be limited to the sizes, shapes, proportions, materials and finish of parts; and changes in details may be made so long as the spirit of this invention is retained.

What is claimed as new is:—

1. A polygonal structure whose wall is composed of rows of units having butt and lap ends and every unit of both types has its upper and lower faces provided with superimposed grooves registering with those in the next row, the extremities of said grooves meeting those in the contiguous units of the same row and registering with those in the next row so that no groove in the structure is exposed; and tongues fitted into registering grooves and also nowhere exposed.

2. A polygonal structure whose wall is composed of rows of units having butt and lap ends and occasional rows of filler units having mitered ends, every unit of both types having its upper and lower faces provided with superimposed grooves registering with those in the next rows, the extremities of said grooves meeting those in the contiguous units of the same row so that no groove in the structure is exposed.

3. A polygonal structure whose wall includes rows of units whereof each unit is cut on broken lines to produce a butt end and a lap end, the latter having a recess at the inner side of the unit receiving the butt end of the contiguous unit, and the upper and lower faces of each unit having longitudinal superimposed grooves extending into said recess so that they meet the grooves in the butt end of the contiguous unit; and a connection between registering grooves in two rows of units.

4. A polygonal structure whose wall includes rows of units having beveled exposed outer faces and whereof each unit is cut on broken lines to produce a butt end and a lap end, the latter having one extremity beveled to match said beveled outer face and a recess at the inner side of the unit receiving the butt end of the contiguous unit, and the upper and lower faces of each unit having longitudinal superimposed grooves extending into said recess so that they meet the grooves in the butt end of the contiguous unit.

5. The herein described building unit for polygonal structures which has butt and lap ends each formed on broken lines, the butt end having an oblique cut with a shoulder at one extremity thereof and the other extremity cut off to the inner face of the unit, and the lap end having a beveled face converging toward said oblique cut, its extremity cut off to engage said shoulder in the butt end of the next unit, and its inner side recessed to receive the oblique cut and the extremity of said next unit.

6. The herein described building unit for polygonal structures which has butt and lap ends each formed on broken lines, the butt end having an oblique cut with a shoulder at one extremity thereof and the other extremity cut off to the inner face of the unit, and the lap end having a beveled face converging toward said oblique cut, its extremity cut off to engage said shoulder in the next unit, and its inner side recessed to receive the oblique cut and the extremity of said next unit, the upper face of the unit having a groove paralleling its inner face for the purpose set forth, one end of said groove running out into said recess and the other end running out into the extremity of the butt end to meet the opposite end of the groove in the contiguous unit.

7. The herein described building unit for polygonal structures which has butt and lap ends each formed on broken lines, the butt end having an oblique cut with a shoulder at one extremity thereof, and the lap end having its extremity cut off to engage said shoulder in the next unit and its inner side recessed to receive the oblique cut of said next unit, each horizontal face of the unit having a groove paralleling its inner face for the purpose set forth.

In testimony whereof I have hereunto set my hand in presence of two subscribing witnesses.

CHARLES E. WEBSTER.

Witnesses:
L. O. HILTON,
N. L. COLLAMER.

Copies of this patent may be obtained for five cents each, by addressing the "Commissioner of Patents, Washington, D. C."